United States Patent [19]

Moore

[11] Patent Number: 4,841,661
[45] Date of Patent: Jun. 27, 1989

[54] FISHERMAN'S COMBINATION CHEST

[76] Inventor: Paul M. Moore, 9345 SW. 41 Ter., Miami, Fla. 33165

[21] Appl. No.: 111,926

[22] Filed: Oct. 23, 1987

[51] Int. Cl.⁴ ............................................. A01K 97/00
[52] U.S. Cl. ..................................... 43/54.1; 222/130
[58] Field of Search ................. 43/54.1, 57.1; 220/20; 222/130, 131, 146.6

[56] References Cited

U.S. PATENT DOCUMENTS

| | | | |
|---|---|---|---|
| 2,539,302 | 1/1951 | Fye | 43/54.1 |
| 3,171,566 | 3/1965 | Mitchell | 43/54.1 |
| 3,877,144 | 4/1975 | LeBlanc | 43/54.1 |
| 4,023,304 | 5/1977 | Singer | 43/54.1 |
| 4,128,170 | 12/1978 | Elliott | 43/54.1 |
| 4,353,182 | 10/1982 | Junkas et al. | 43/54.1 |
| 4,697,379 | 10/1987 | McPhaul | 43/54.1 |

Primary Examiner—M. Jordan
Attorney, Agent, or Firm—Oltman and Flynn

[57] ABSTRACT

The concept of the present invention, "Fisherman's Friend" is a storage chest which serves a multiplicity of purposes for a fisherman. The chest would incorporate a vacuum bottle for hot or cold beverage, a cooler (ice chest), storage drawers for fishing equipment, a lid or cover which could double as a life preserver, with detachable hinges, a detachable flashlight, a small storage drawer for first aid/tool storage, a slideable, removable food tray, and three handles, one at each end on the back side of the "Fisherman's Friend" storage chest, and two pouring spouts, one at each end for drainage. The "Fisherman's Friend" storage chest makes it easier for fisherman to carry the equipment and supplies they desire when fishing.

8 Claims, 2 Drawing Sheets

FISHERMAN'S COMBINATION CHEST

SUMMARY

The present invention, "Fisherman's Friend" relates to the sport of fishing, but at the present time, there is not a single unit to compare the present invention, "Fisherman's Friend" to. The present invention could only be compared to a group of items —cooler, tackle box, vacuum thermos bottle, first aid box, and flashlight separately; but the present invention, "Fisherman's Friend" is designed to combine all of the above plus more, which will be explained further in the following statements.

The object of the invention is to allow a storage area for hot/cold beverage, known from here on as a vacuum thermos bottle with a pouring spout and a twist-off lid. A further object of the invention is to have a removable food storage tray which is located in the cooler. A further object of the invention is to have a tackle drawers' storage compartment for storage of fishing tackle between the adjustable partitions. A further object of the invention is to have a fist aid/tool drawer compartment in which to store first aid supplies or small tools in. Another object of the invention is to have a detachable flashlight which is used to see at night.

A further object of the invention is to have a ruler scribe on it to measure fish caught.

A further object of the invention is to have three carrying handles, one on each end and third on the back of the invention.

Another object of the invention is to have a lid or cover which can serve as a seat, cover, lid, or life preserver because of its detachable hinges on the back of the invention.

Another object of the invention is to have an outer wall which all parts are either attached, hinged, scribed or stored into it.

A further object of the invention is to provide space between the exterior wall, interior walls and compartments for a polystryrofoam insulation which serves to insulate for the vacuum thermos bottle, cooler and to add strength to the overall structure of the invention.

Other objects and advantages of the invention will become better understood hereafter for a consideration of the specification with reference to the accompanying drawings forming parts thereof, and which like numerals correspond to like parts throughout the different views of the invention and wherein:

DESCRIPTION

Figure 1:
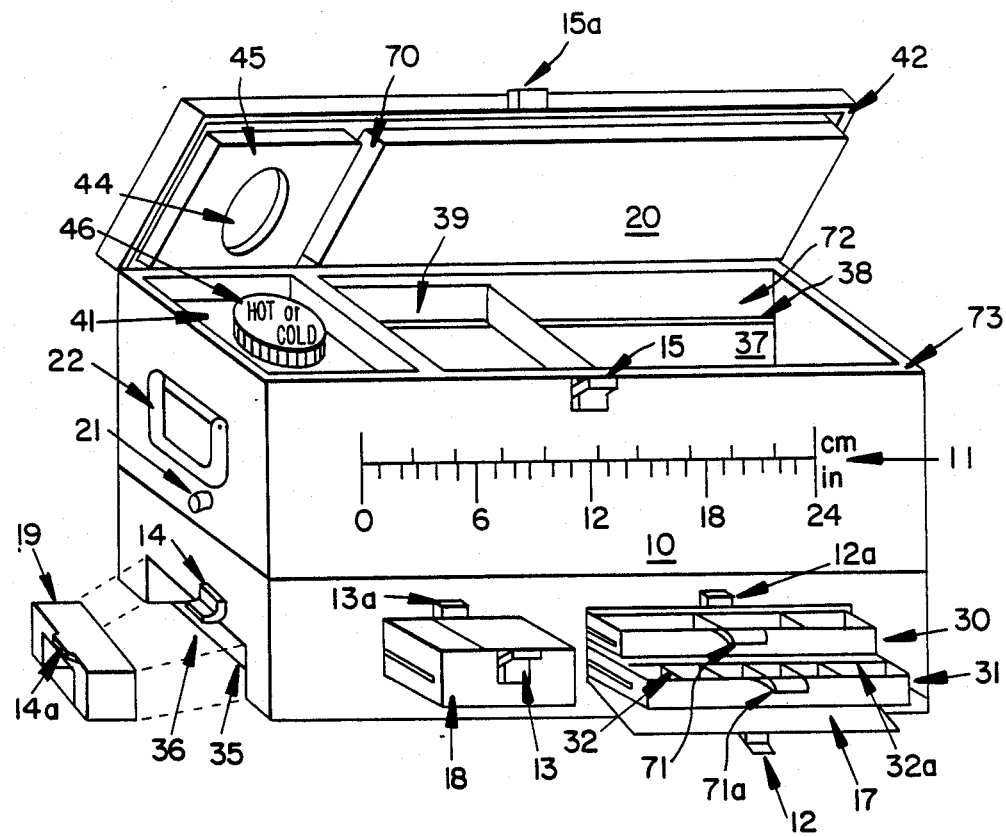
FIG. 1 is a modified view of the invention's front, left side, inside compartments, and underside.

Referring to the drawing, FIG. 1, the "Fisherman's Friend" main body/ or frame 10, which forms the outside wall, where on the front is scribed a fuller 11, there are three handles 22, as shown in FIG. 1 (23, 24 are not shown in this figure) attached to the "Fisherman's Friend" main body/ or frame to allow draining of the vacuum thermos bottle 41 and the cooler 37 sections. The tackle drawers 30, 31 of the "Fisherman's Friend" FIG. 1, have adjustable partitions 32, 32a. The tackle drawers 30, 31 are held closed by a door 17, which is hinged (not shown) to the "Fisherman's Friend" main body/ or frame 10. The door 17 itself, is held closed by a snap lock 13, 13a shown in FIG. 1. The detachable flashlight of the "Fisherman's Friend" is stored or held in a cavity 36 by a snap lock 14, 14a. The cavity 36 has a lip 35, where the detachable flashlight 19 rests on it when it is stored/ or held in the stored position. The cooler 37 area is the main storage area of the "Fisherman's Friend". On the two long sides 72 (72a not shown) of the cooler 37 storage area are scribed two guides 38 (38a not shown) for the removable food storage tray 39 to slide on.

The non-removable vacuum thermos bottle 41 of the "Fisherman's Friend", as shown in FIG. 1, has a twist-off lid 46. The lid/ or cover 20 of the "Fisherman's Friend" has two recesses 44, 70 to allow the lid/ or cover to close over the twist-off lid 46 of the vacuum thermos bottle 41 and the cooler 37. The bottom side of the lid/ or cover has a soft polyplastic flexible seal 42 inserted into it where the cover/lid 20 comes into contact with the top of the vacuum thermos bottle 41 and cooler 37 partition top or 73. The lid/ or cover is held closed by a snap lock 15, 15a.

Figure 2:
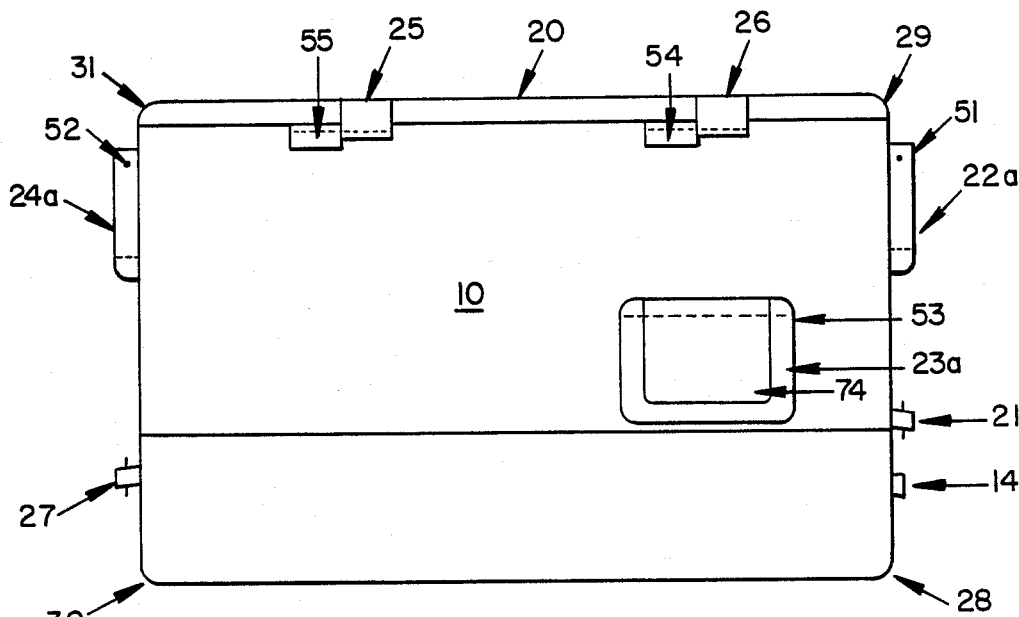
FIG. 2 is a back view of the invention, showing the back side, location of third handle, and hinges.

Referring to the drawing FIG. 2 of the "Fisherman's Friend", the position of the three handles, 22, 23 and 24, are attached to the main body/ or frame 10. The handles 22, 23 and 24 are of three parts, a metal pin 51, 52 and 53, of which 53 is shown by an invisible line marking handles 22a, 23a and 24a, and handle holder 74 (75 and 76 are not shown). The two pouring spouts 21 and 27 can be seen at each end of the main body/ or frame 10, as mentioned in FIG. 1 and shown in FIG. 2. The two hinges 25 and 26 can be seen in FIG. 2. They are connected together by metal pins 54 and 55, shown by invisible line markings. The hinges are connected to the main body/ or frame 10 and cover/ or lid 20. The numbers 28, 29, 30 and 31 only serve to point out that all edges and corners have a roundness to them on the "Fisherman's Friend".

Figure 3:
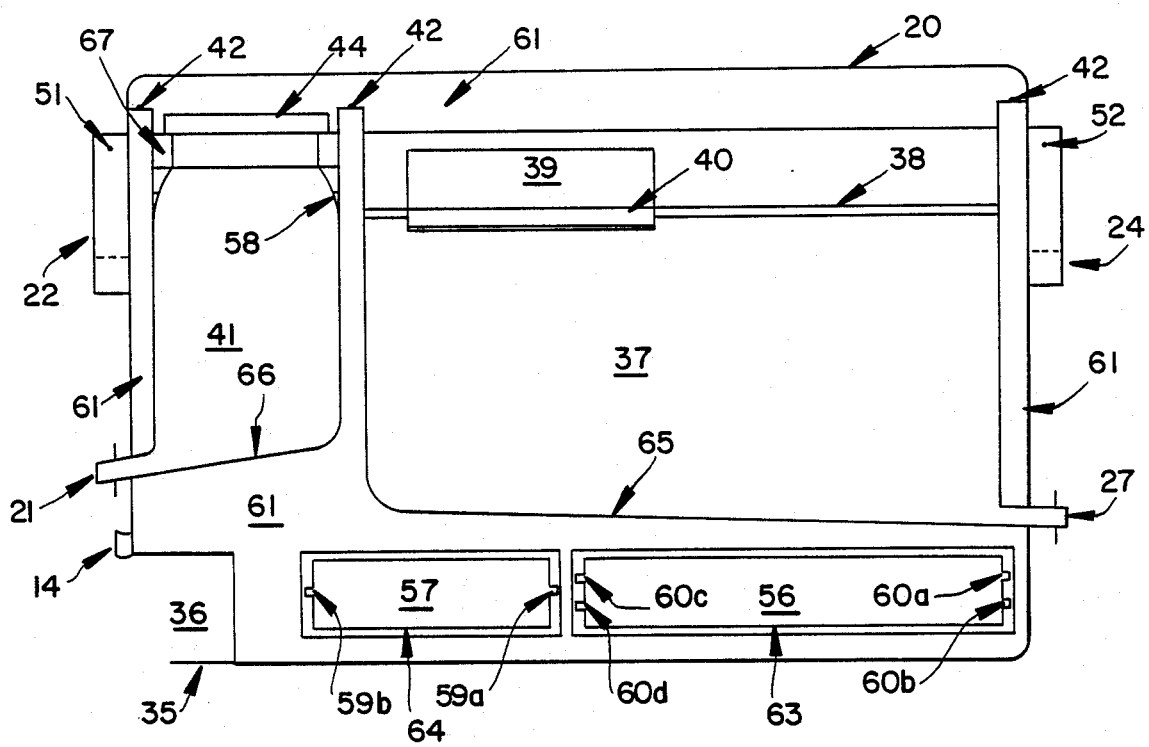
FIG. 3 is a vertical cross sectional view of the invention showing the different embodied compartments.

Referring to the drawing, FIG. 3 of the "Fisherman's Friend" is the vertical cross sectional. The cavity 36 for the detachable flashlight 19 shown in FIG. 1 can be seen along with the lip 35 which the detachable flashlight rests on. The tackle drawer compartment 56 can be seen in FIG. 3 along with the guide slots 60a, b, c, and d in the sides of the tackle drawer compartment 56. The first aid/ or tool drawer compartment 57 can be seen with guide slots 59, 59a on the sides for the first aid/ or tool drawer 18, shown in FIG. 1, guides 34, 34a to slide in. The numbers 63 and 64 refer to the frames of the tackle drawer compartment 56 and the first aid/or tool drawer compartment 57 of the "Fisherman's Friend". The cooler 37 area can be seen in FIG. 3 and how the bottom 65 is designed to drain toward the pouring spout 27. The vacuum thermos bottle 41 area can be seen in FIG. 3 and how the bottom 66 is designed to drain toward the pouring spout 21. On the lip 58, it can be seen that the top section 67 of the vacuum thermos 41 rests on and is connected to. In FIG. 3, the area 61 that a polystryrofoam or similar material is used for insulation and added strength can be seen.

Figure 4:
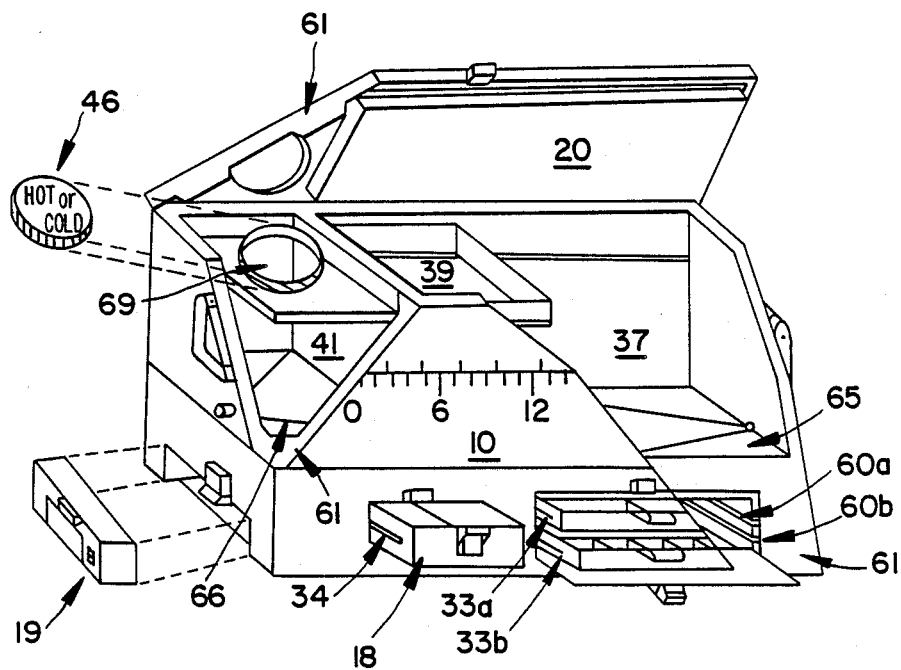
FIG. 4 is a modified cross sectional drawing of the invention.

Referring to the drawing, FIG. 4 of the "Fisherman's Friend", a better view of the bottoms 65 and 67 of the cooler 37 and vacuum thermos bottle 41 can be seen as to the drainage design of both. The attached drawers 30 and 31 referred to in FIG. 1, guides 33a and 33b (33c and 33d not shown) in FIG. 4 that slides in the guide slots 60, a,b,c and d shown in FIG. 3 of the tackle drawer compartment 56 shown in FIG. 3. The guide 34a (34b not shown) of the first aid/ or tool drawer 18 can be seen. The guides 34a and 34b slide in the guide slots 59a and 59b of the first aid/ or tool drawer compartment 57, FIG. 3. The vacuum thermos bottle 41 filling opening 69 can be seen in FIG. 4. Having thus described the invention, "Fisherman's Friend", it is to be understood that certain modifications in the construction and arrangement of parts thereof will be made, as deemed necessary, without departing from the scope of the appended claims.

I claim:

1. A portable fishing accessory comprising:
   a box-like body having a bottom wall and front, back and opposite end walls which extend up from said bottom wall, said box-like body providing a food storage compartment which is open at the top;
   a removable cover extending across the top of said box-like body and closing the top of said compartment;
   said body having a cavity on the outside of one of said walls which extend up from said bottom wall;
   a flashlight removably seated in said cavity;
   and manually releasable latch means acting between said body and said flashlight to hold said flashlight seated in said cavity.

2. A fishing accessory according to claim 1 and further comprising:
   a thermos bottle permanently positioned in said box-like body and having a manually removable top lid which is accessible from the top when said cover is removed;
   and a pouring spout extending out from one of said walls of the box-like body which extend up from said bottom wall, said pouring spout communicating with the interior of said thermos bottle at its lower end.

3. A portable fishing accessory according to claim 2 and further comprising:
   a calibrated scale on the outside of said front wall of the box-like body.

4. A portable fishing accessory according to claim 3 wherein:
   said box-like body has a plurality of openings in said front wall below said calibrated scale;
   and further comprising:
   a plurality of drawers horizontally slidably mounted in said box-like body at said openings in its front wall.

5. A portable fishing accessory comprising:
   a box-like body having a bottom wall and front, back and opposite end walls which extend up from said bottom wall, said box-like body providing a food storage compartment above said bottom wall and between said front and back walls next one of said end walls, said food storage compartment being open at the top;
   a removable cover extending across the top of said box-like body and closing said food storage compartment at the top;
   a thermos bottle permanently positioned in said box-like body between said food storage compartment and the opposite end wall, said thermos bottle having a manually removable top lid which is accessible from the top of said box-like body when said cover is removed;
   and a pouring spout extending out from said opposite end wall and communicating with the interior of said thermos bottle at its lower end.

6. A portable fishing accessory according to claim 5 and further comprising:
   a calibrated scale on the outside of said front wall of the box-like body.

7. A portable fishing accessory according to claim 6 wherein:
   said box-like body has a plurality of openings in said front wall below said calibrated scale;
   and further comprising:
   a plurality of drawers horizontally slidably mounted in said box-like body at said openings in its front wall.

8. A portable fishing accessory according to claim 5 wherein:
   said box-like body has a plurality of openings in said front wall; and further comprising:
   a plurality of drawers horizontally slidably mounted in said box-like body at said openings in its front wall.

* * * * *